(12) United States Patent
Meade et al.

(10) Patent No.: US 6,507,812 B1
(45) Date of Patent: Jan. 14, 2003

(54) MOCK TRANSLATION METHOD, SYSTEM, AND PROGRAM TO TEST SOFTWARE TRANSLATABILITY

(75) Inventors: Elizabeth Carol Meade, Austin, TX (US); Jerald Lee Monson, Austin, TX (US); Joseph C. Ross, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/342,433

(22) Filed: Jun. 29, 1999

(51) Int. Cl.$^7$ ............................. G06F 17/20; G06F 9/45
(52) U.S. Cl. ................................................. 704/8; 717/8
(58) Field of Search ...................... 704/8, 2, 3; 717/5, 717/7, 8

(56) References Cited

U.S. PATENT DOCUMENTS

| | | |
|---|---|---|
| 5,225,981 A | 7/1993 | Yokogawa |
| 5,309,358 A | 5/1994 | Andrews et al. |
| 5,418,718 A | 5/1995 | Lim et al. |
| 5,499,335 A | 3/1996 | Silver et al. |
| 5,523,946 A | 6/1996 | Kaplan et al. |
| 5,583,761 A * | 12/1996 | Chou ........................ 707/536 |
| 5,664,206 A * | 9/1997 | Murow et al. ................. 704/8 |
| 5,678,039 A * | 10/1997 | Hinks et al. .................... 707/4 |
| 5,787,452 A | 7/1998 | McKenna |
| 5,870,084 A | 2/1999 | Kanungo et al. |
| 5,889,481 A | 3/1999 | Okada |
| 5,903,859 A * | 5/1999 | Stone et al. .................... 704/8 |
| 5,992,737 A | 11/1999 | Kubota |
| 6,024,289 A | 2/2000 | Ackley |
| 6,073,146 A | 6/2000 | Chen |
| 6,091,897 A | 7/2000 | Yates et al. |
| 6,092,037 A * | 7/2000 | Stone et al. .................... 704/8 |
| 6,286,131 B1 | 9/2001 | Beers et al. |

OTHER PUBLICATIONS

Fisher, J.; Chong, J.; *Improving the Usability of Online Information when Translated from English to Chinese*; IEEE, 1996.

Takagi, H.; Development of an Eye–movement Enhanced Translation Support System; IEEE, 1998.

Wilter, G.; Translating Machine Displayable Information and Documentation; IEEE, 1989.

U.S. patent application Ser. No. 09/342,432, Meade et al., filed Jun. 29, 1999.

U.S. patent application Ser. No. 09/342,431 Rojas et al., filed Jun. 29, 1999.

U.S. patent application Ser. No. 6,233,545 B1; Dartig; filed May 15, 2001.

* cited by examiner

*Primary Examiner*—Patrick N. Edouard
(74) *Attorney, Agent, or Firm*—Marilyn Smith Dawkins; Bracewell & Patterson, L.L.P.

(57) ABSTRACT

A mock translation method and system is provided which converts base-language data and performs a mock translation on it to produce internationalization test data. The mock translation data is created by inserting additional characters, such as a tilde (~) into each of the text strings from the user interface of a software program. The additional characters are used as a placeholder to accommodate the additional space needed for later translating the text into a different language. In addition, field boundary characters, such as brackets, are used to designate the beginning and end of the text with the placeholders. This data is stored in localization files and displayed in a software application in place of the English or foreign-language text. By visually inspecting each screen, the programmer or proofreader is able to easily recognize many internationalization errors, without requiring the ability to read any foreign language. These errors include truncation, alignment, or other formatting errors, and programming errors such as text that is hard-coded, text missing from localization files, localization files missing from the program build, and text composed of more than one translated message.

12 Claims, 7 Drawing Sheets

MOCK TRANSLATION METHOD, SYSTEM, AND PROGRAM TO TEST SOFTWARE TRANSLATABILITY

CROSS REFERENCE TO RELATED APPLICATIONS

This application shares common text and figures with commonly assigned, copending application Ser. No. 09/342,431, "System Method, And Program For Testing Translatability of Software by Using English Multi-byte Transliteration Creating Double-wide Characters", and application Ser. No. 09/342,432, "Mock Translation System, Method, And Program Using Multi-byte Placeholder Characters to Test Translatability of Software That Will Display Multi-byte Languages", which are hereby incorporated by reference.

BACKGROUND OF THE INVENTION

1. Technical Field

The present invention generally relates to tools for developing software for international use and in particular to multi-language software development. Still more particularly, the present invention relates to a system for testing language translatability in computer software.

2. Description of the Related Art

As computers have become more prevalent, it has become desirable for software developers to be able to market their products to those people who do not speak the native language of the software developers. In particular, it is desirable that software developed in the English language be available to those persons, both in the United States and in the rest of the world, that do not speak English. Accordingly, many software applications that are developed in English are later translated for use by non-English speakers.

The process of translating a software package into another (or more than one other) language is time-consuming and expensive. Each text message, menu, and button must be translated to allow the user to operate the program. The most direct way to do this is to search the entire program source code for every text string, i.e., every string of characters that would be displayed to the user, and translate each of these to the new language.

This approach has several problems. One problem is that the use of this method means that the software must be specifically translated and compiled for each intended language. This, of course, is an expensive process in itself, and means that any change in the source code requires each language version of the code to be edited and recompiled.

One solution to this problem is the use of separate localization files, in which the text strings that are to be displayed are stored separately from the executable code itself. As the software is executed, the text for every given display screen is simply read from the localization files, in whichever language is stored in the file. In this manner, the text in the localization file can be translated without disturbing the executable, and the executable can be changed or replaced without disturbing the translated text (except, of course, that if the text to be displayed changes, the corresponding entries in the localization files must also be changed). The localization files may be in any number of formats, including compiled message catalogs, Java resource files, HTML bundles, and many others.

However the translation is handled, each screen of the program in operation must then be proofread to ensure that the translated text properly fits the display in place of the original text. Because different languages require different numbers of letters and spaces to express corresponding ideas, it is possible that the translated text will be truncated or misaligned when put in place of the original text. The programmer, who probably only speaks her native language, would be unable to reliably proof-read the translated display to ensure that the translated results are displayed properly. Therefore, it has become common practice to hire individuals with backgrounds in other languages to proofread each screen of the translated program, in each language, to be sure that the translated text isn't truncated, missing, or otherwise misformatted. These errors, of course, would not be readily apparent to one that did not speak that language.

In fact, at the time the programmer is testing the software, translations are typically unavailable. The translations are usually done much later in the software development process, and the software programmer is unable, using conventional tools, to determine if the software being developed will be able to properly handle the language translations at all.

The International Business Machines Corporation has published guidelines for software design which takes into account the typical amount of "extra" space needed to display the translation of an English word or phrase of given length; see IBM National Language Design Guide: Designing Internationalized Products (IBM, $4^{th}$ Ed. 1996), which is hereby incorporated by reference. By following these guidelines, generally programmers are able to design screen displays with sufficient extra display space so that when another language is used (preferably by reading entries in a localization file), it will display correctly.

Even using these guidelines, it would be desirable to provide a system to allow a programmer to examine each screen for possible internationalization problems without requiring the participation of those fluent in the foreign languages.

SUMMARY OF THE INVENTION

It is therefore one object of the present invention to provide an improved tool for developing software for international use.

It is another object of the present invention to provide an improved tool for multi-language software development.

It is yet another object of the present invention to provide an improved system for testing language translation in computer software.

The foregoing objects are achieved as is now described. A mock translation method and system is provided which converts base-language data, which is United States English in the preferred embodiment, and performs a mock translation on it to produce internationalization test data. The mock translation includes placeholder data, e.g., characters, that expands the spacing allocated to the text to accommodate for the spacing required for translations. In a preferred embodiment, all English text that would appear on the graphical user interface (i.e., buttons, menus, pop-up dialogs, dialog window titles, dialog text, error messages, help windows, etc.) is expanded using tildes, i.e., , and is enclosed with brackets, i.e., [ ]. This mock translation data is stored in localization files and displayed in a software application in place of the English or foreign-language text. The GUI is then tested by visually inspecting each screen. The programmer or proofreader is able to easily recognize many errors that would occur if the GUI were to be displayed in a translated language, without requiring the ability to read any foreign languages. These errors, referred to as internationalization errors, include truncation, expansion, alignment, or other formatting errors, and programming errors such as text that is hard-coded, text missing from localization files, localization files missing from the program build, and text composed of more than one translated message.

One advantage of this invention is that this tool can be used in conjunction with the functional verification phase of testing software under development by testers who may not be skilled in any other language. Previously, these internationalization errors were identified by language experts during a later phase of testing referred to as translation verification testing. Now these errors can be identified at the same time as the regular verification testing occurs. The expanded text is readable in the language of the tester and can be run on the usual test systems. As such, these internationalization errors can be identified earlier in the software development and testing process and can be identified more economically.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
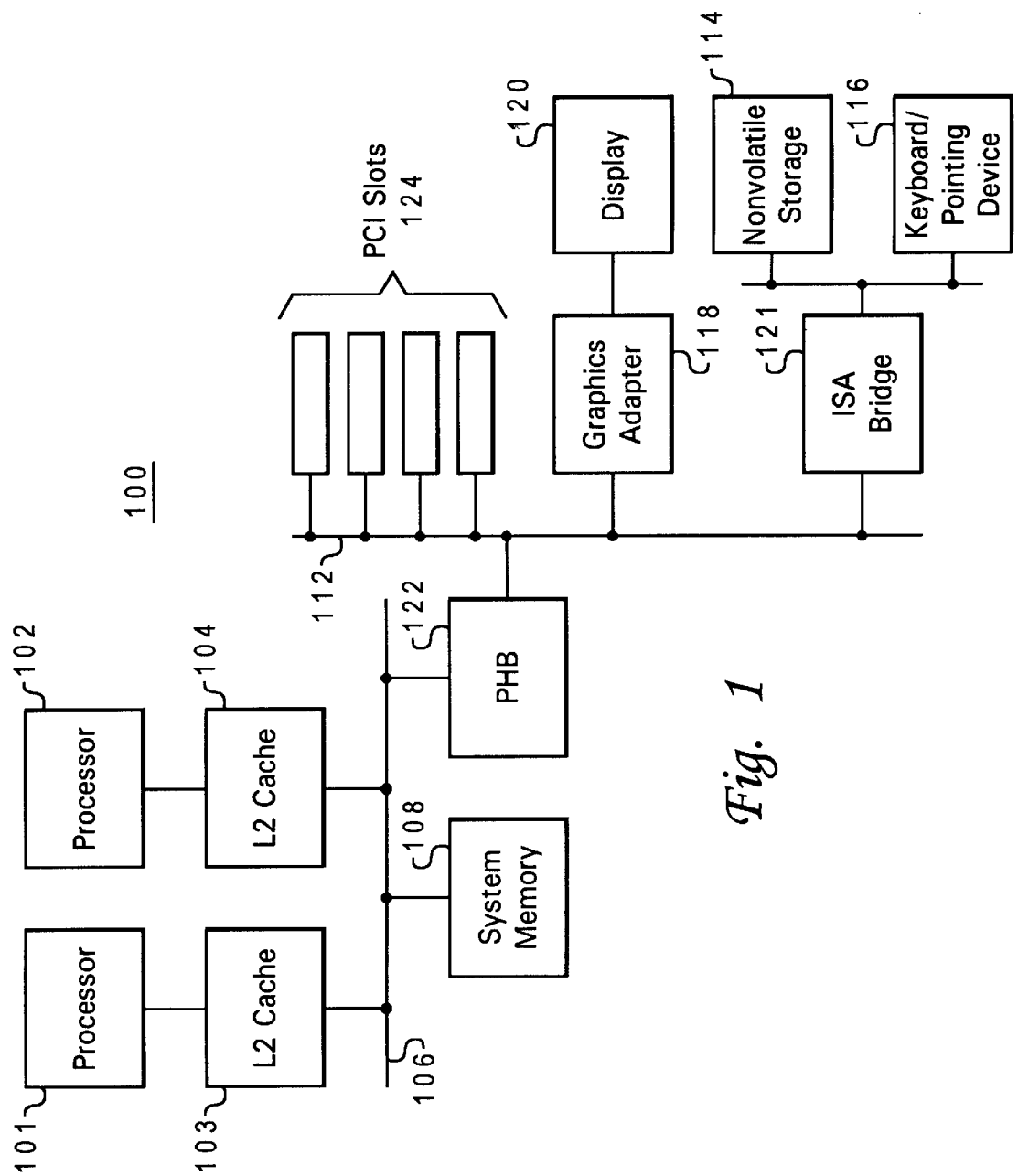
FIG. 1 depicts a data processing system in accordance with a preferred embodiment of the present invention.

With reference now to the figures, and in particular with reference to FIG. 1, a block diagram of a data processing system in which a preferred embodiment of the present invention may be implemented is depicted. Data processing system 100 may be, for example, one of the computers available from International Business Machines Corporation of Armonk, N.Y. Data processing system 100 includes processors 101 and 102, which in the exemplary embodiment are each connected to level two (L2) caches 103 and 104, respectively, which are connected in turn to a system bus 106.

Also connected to system bus 106 is system memory 108 and Primary Host Bridge (PHB) 122. PHB 122 couples I/O bus 112 to system bus 106, relaying and/or transforming data transactions from one bus to the other. In the exemplary embodiment, data processing system 100 includes graphics adapter 118 connected to I/O bus 112, receiving user interface information for display 120. Peripheral devices such as nonvolatile storage 114, which may be a hard disk drive, and keyboard/pointing device 116, which may include a conventional mouse, a trackball, or the like, are connected via an Industry Standard Architecture (ISA) bridge 121 to I/O bus 112. PHB 122 is also connected to PCI slots 124 via I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the exemplary figures below are provided solely as examples for the purposes of explanation and are not intended to imply architectural limitations. In fact, this method and system can be easily adapted for use on any programmable computer system, or a network of systems, on which software applications can be executed.

According to the preferred embodiment of the invention, the text to be displayed on any screen of a software application is stored in a message catalog file (localization file) which is separate from the executable program. By doing so, the software application may be readily translated into any number of languages by simply translating the text in the localization file, without changing the executable code at all. The screen layouts of the software program are to be compatible with any language into which the package might be translated; to accomplish this, internationalization guidelines such as those published by the International Business Machines Corporation are used.

The preferred embodiment provides a tool for testing a software package which utilizes localization files to ensure compliance with the internationalization standards. This testing tool provides an easy way for the programmer to visually inspect the software package being tested to ensure that as long as the target language is adequately described by the internationalization guidelines, then any translated screen displays and text messages will be free of internationalization errors, without requiring programmers to read any foreign languages.

In this embodiment, the base-language text (which will hereinafter be referred to as English for ease of reference, but which could be any language) to be displayed is placed in a localization file in a conventional manner. Instead of being translated into another language, as is conventional, a mock-translation process is executed on the localization files. This mock translation process produces an output which contains, for a given English word or phrase, an open square-bracket, a string of placeholder characters, the original English word or phrase, and a close square-bracket. It should be noted, of course, that any string of readily-identifiable characters may be used in this string, as long as the beginning and end of the string are easy to spot on visual inspection. The number of placeholder characters used to preface an English word or phrase provides a desired field length to accommodate translations and is based on the internationalization guidelines, and is, in this embodiment, as follows:

| Number of Characters in English Text | Additional Characters Added |
|---|---|
| Up to 10 | 20 |
| 11–20 | 20 |
| 21–30 | 24 |
| 31–50 | 30 |
| 51–70 | 28 |
| Over 70 | 30% of the number of characters in the English text |

This allocation of additional characters accommodates the greatest number of extra characters needed for given ranges, according to the IBM internationalization guidelines. This provides a testing method which will be effective for the widest range of potential language translations. Of course, in practice, those of skill in the art may vary these figures to fit the particular translations that will be made on the software.

Any character can be used as the placeholder character, as long as it can be easily distinguished from the text which would normally be present. In the preferred embodiment, the tilde character () is used, since this character is easy to distinguish, rarely appears in standard English text, and multiple tildes are virtually never placed together in any common English usage.

The process of converting the English text into this output is referred to as a mock translation, since the output is stored in the localization file as if it were a translation according to conventional methods. The localization file is then used as if it were a standard file with a foreign translation, but the software application will display the mock translation data instead of the original text or a foreign translation.

Figure 2:
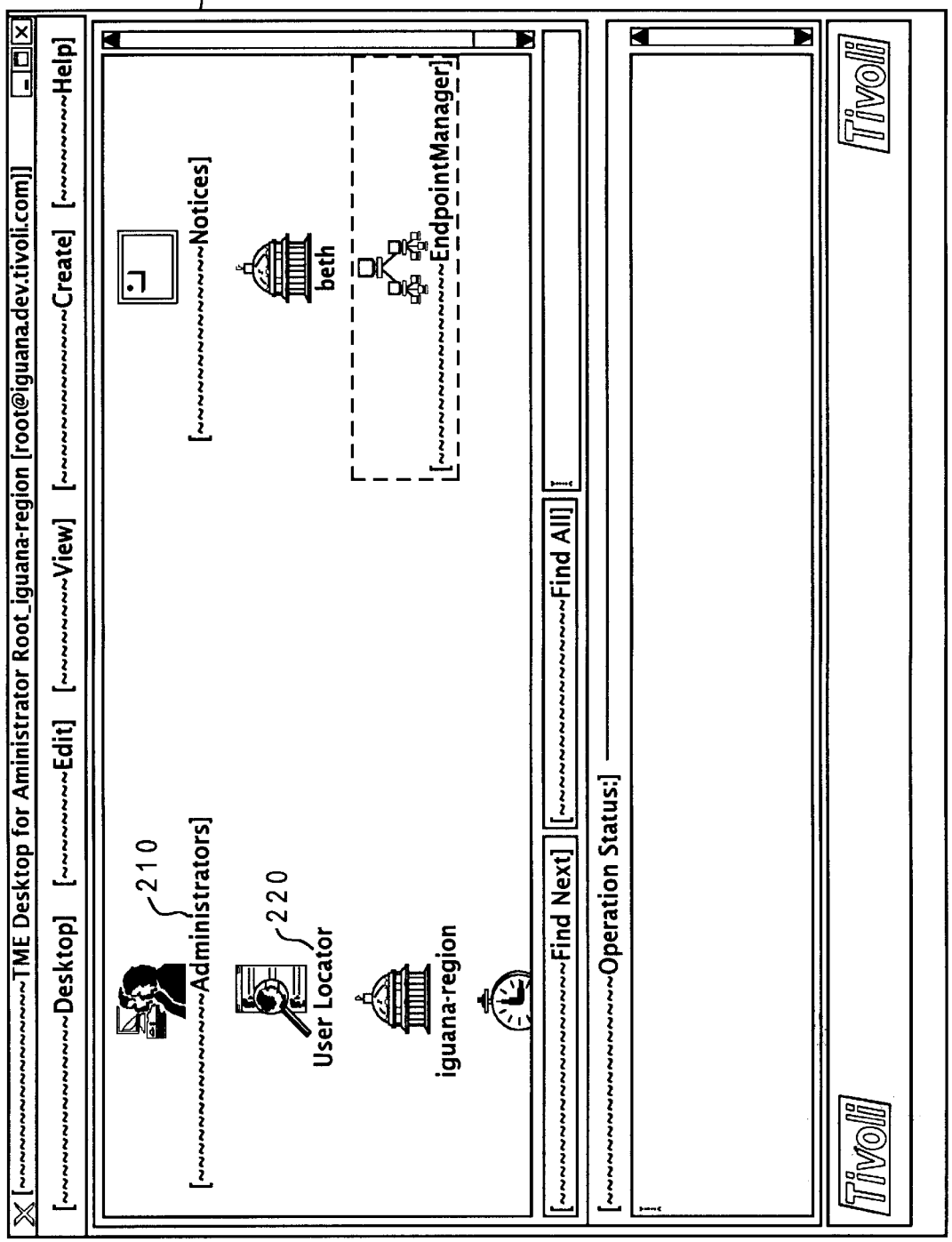
FIG. 2 is an exemplary display screen after a mock-translation process in accordance with a preferred embodiment of the invention.

Referring now to FIG. 2, since the mock translation has distinct beginning and end characters, it becomes a simple process for the user or programmer to check each screen of the executing application to determine if any characters are missing from the beginning or end of the "mock-translated" text. FIG. 2 shows an exemplary computer display 200, which has been built using mock-translated localization files. In this figure, the "Administrators" label 210 appears as it should after mock-translation. Note that the label begins with an open bracket, then a series of tilde placeholder characters appears before the English text, and then a close bracket ends the label. Here, we see that after translation to a foreign language, label 210 will display correctly.

Conversely, the "UserLocator" label 220 has not been properly mock-translated, as it appears normal, without brackets or placeholder characters. Since this is the case, it is clear that label 220 would not properly translate to a foreign language; it would appear in English exactly as it does here. The mock translation has allowed this problem to be seen much earlier in the internationalization process, well before the software is actually translated. From such a visual inspection, the error can be identified as one in which the text may have been "hard-coded" into the program.

Figure 3:
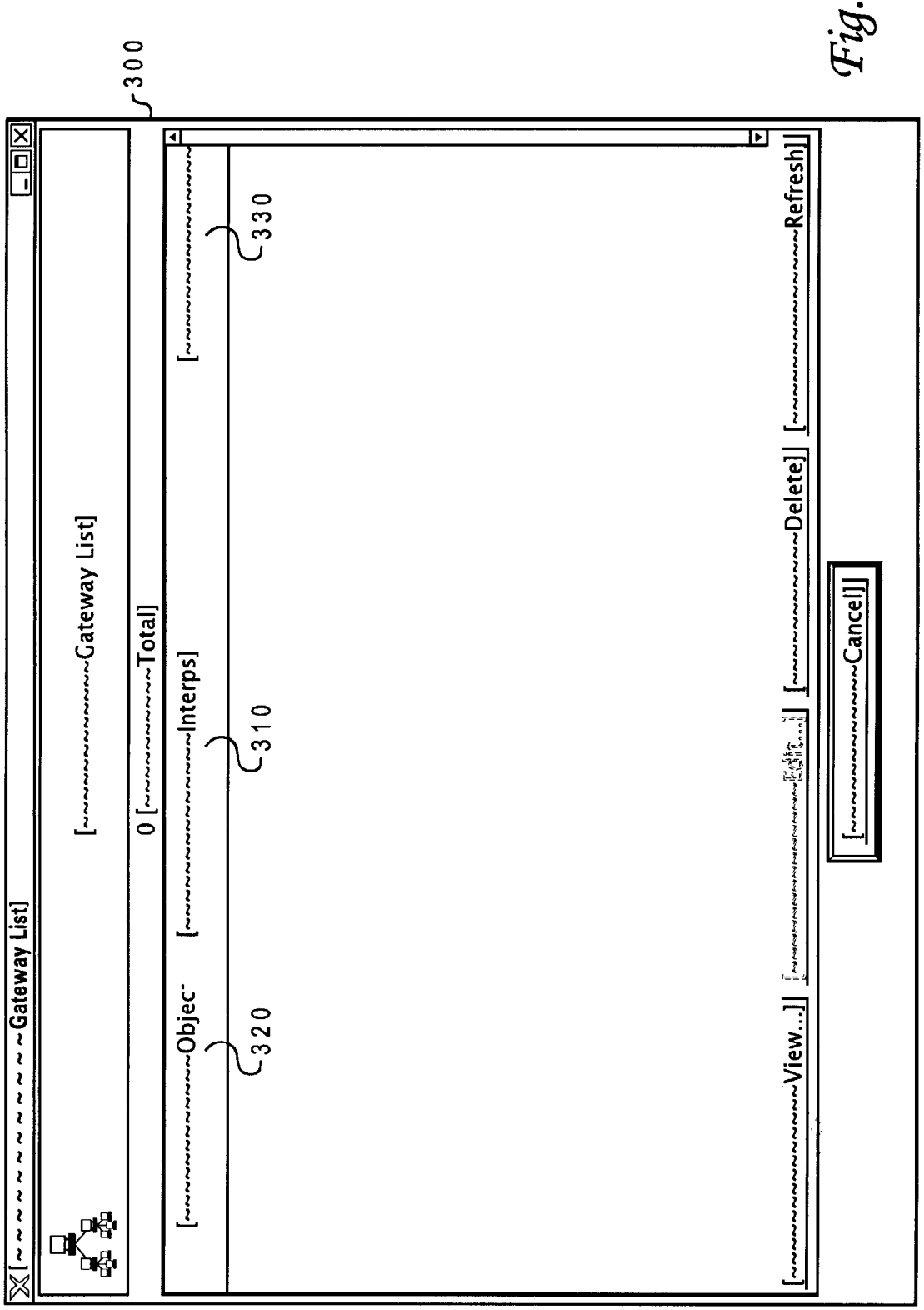
FIG. 3 depicts an exemplary display screen after a mock-translation process in accordance with a preferred embodiment of the invention, illustrating some errors.

With reference now to FIG. 3, another exemplary computer display 300 is shown. In this figure, note that the "interps" label 310 has been properly mock-translated, as described above. Label 320, however, has not been properly translated. Here, it is immediately apparent that the "Objects" label has been truncated after expansion; the open bracket and placeholder characters are present, but the English text is truncated and no close bracket appears. This type of error indicates that the programmer has not allocated enough room on the display for the translated label; while it appears correctly in English, in some languages it would show an error. Note that even if the entire English word were present, the absence of a closing bracket would indicate that in actual translation, at least the last character of the translated word could be truncated.

Label 330 shows a similar problem. Note that here, only the open bracket and the placeholder tildes are shown; this indicates that the text itself has been forced to scroll of the screen. This label must therefore be moved within the software application if it is to appear properly in the final translated product. Again, the error in label 330 is clearly apparent after the mock translation of the preferred embodiment has been performed. Without using the mock translation method, this error would simply not have appeared on-screen until after translation, and the error would therefore be very difficult to detect until very late in the software development process.

Figure 4:
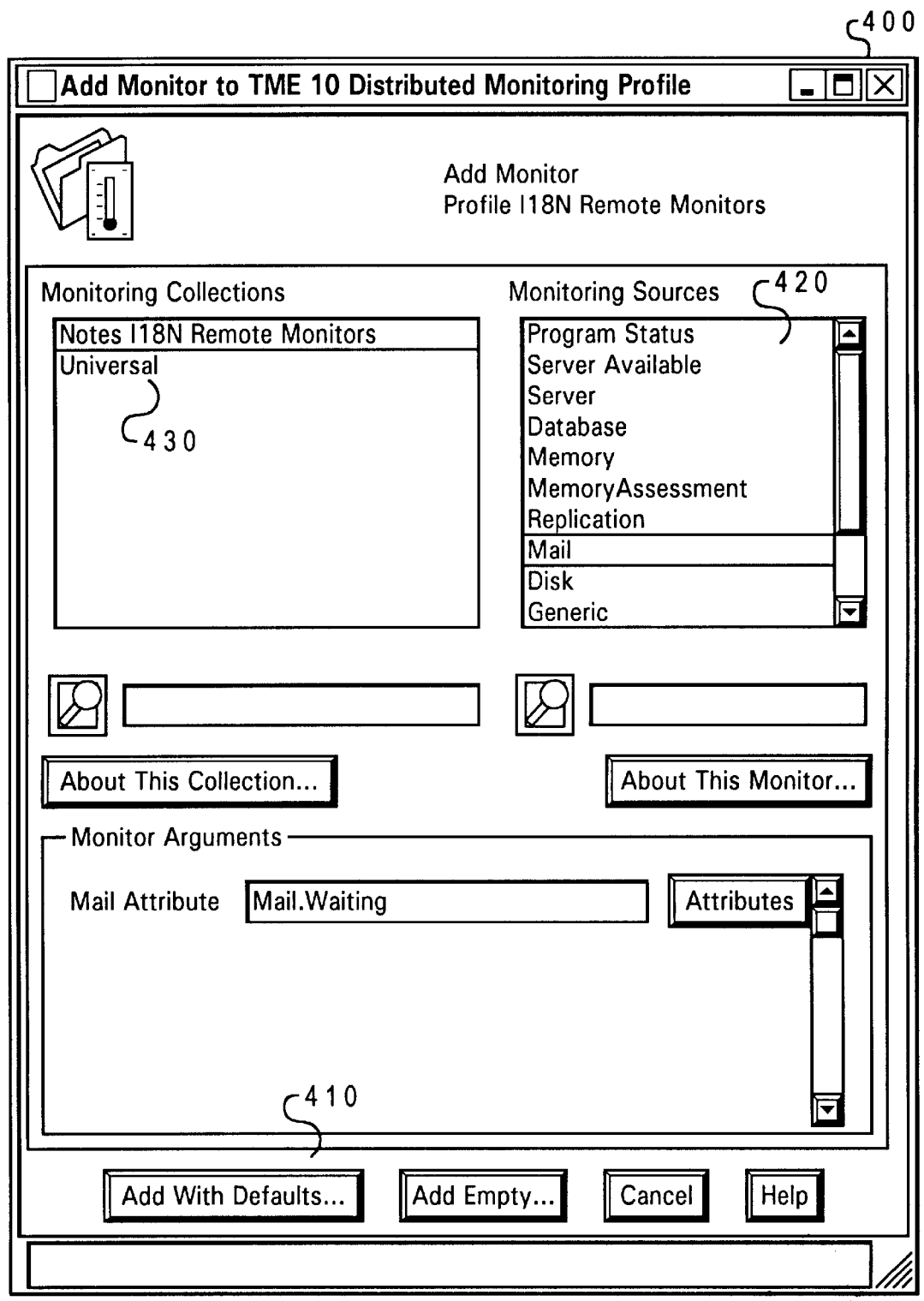
FIG. 4 is an exemplary display screen before a mock-translation process in accordance with a preferred embodiment of the invention.

FIG. 4 shows a sample application display screen 400. Note that this screen is entirely in standard English, including each of the "buttons" at the bottom of the screen, e.g., button 410, and including menu options 420.

Figure 5:
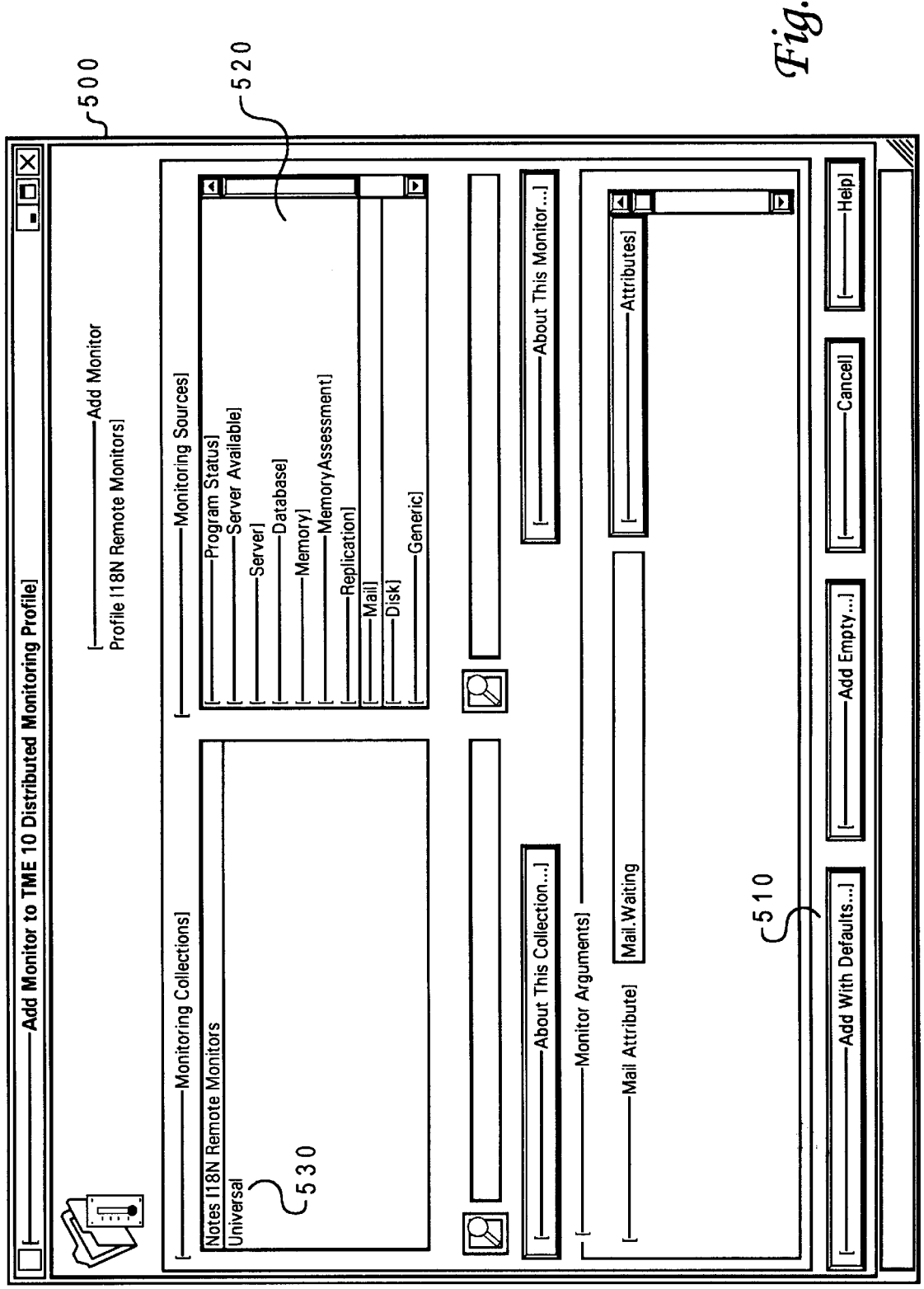
FIG. 5 depicts an exemplary display screen after a mock-translation process in accordance with another preferred embodiment of the invention, illustrating some errors.

Referring now to FIG. 5 (and with reference also to FIG. 4), since the mock translation has distinct beginning and end characters, it becomes a simple process for the user or programmer to check each screen of the executing application to determine if any characters are missing from the beginning or end of the "mock-translated" text.

Furthermore, since the mock-translated text has been expanded, using placeholder characters, to meet internationalization guidelines, it is also now a simple matter to examine each screen for alignment errors or other formatting errors.

Any hard-coded text, which has not been put through the mock-translation process, will also be apparent since there will be no beginning or end markers or placeholder characters. Note, for example, the "Add With Defaults" button. In FIG. 4, of course, this button 410 is all plain English text. In mock-translated FIG. 5, however, it is clear that corresponding button 510 has been mock translated, since brackets and placeholder characters are visible. Menu items 420 in FIG. 4 are similarly mock-translated as menu items 520 in FIG. 5. Note, conversely, that the "Universal" menu item 530 appears exactly as in FIG. 4 as menu item 430; this text has therefore been hard-coded, and this error can be easily spotted and repaired.

Another common error, not shown here, which may be easily detected using this mock-translation technique, is the presence of labels or other text which is composed of two or more separately-translated text strings. Because many foreign languages, when translated from English, will rearrange the word order of subject, objects, and verbs, each phrase to be translated should be translated as a whole if it is to be displayed correctly in other languages. For this reason, composed text must be eliminated. Using the mock-translation techniques described herein, it is a simple matter for the software programmer or developer to spot text composed of piecemeal parts, since placeholder characters will appear with each separate piece of mock-translated text.

Note that in FIGS. 4 and 5, the tilde placeholder has been replaced with a dash (--). This illustrates another innovative mock-translation technique, useful when the software is to be translated into Japanese or other languages that use multi-byte character sets.

The United States and other countries which use a standard ASCII character set require only a single byte to identify individual characters. Some other languages, because they are more extensive than English, use a multi-byte character set for language generation. For ease of reference, multi-byte character sets will be discussed as "double-byte" characters and character sets, but those of skill in the art will recognize that these teachings apply to any character sets which use more than one byte to represent a single character. Translation of single-byte languages into a double-byte character set for foreign use involves additional concerns because it is possible that the double-byte character may be read as two single-byte characters.

One specific (and notorious) example is the "5C" problem; many double-byte characters have "5C" as the second byte, but "5C" represents a backslash character (\) in a single-byte character set. Therefore, many double-byte characters may be incorrectly displayed as a different character followed by a backslash.

The mock translation system provides a solution to this problem, by performing a mock translation as described above, but using double-byte characters for the brackets and placeholder characters. By using a double-byte, double-wide dash character (character 815C) as the placeholder character, double-byte translation problems will also be evident on visual inspection. The double-wide dash character itself is subject to the "5C" problem, so if the display of double-byte characters is problematic, backslash characters will be visible in the placeholder character field. Note that in FIG. 5, translated menu items 520 appear correctly with placeholder dashes, and no backslash characters are visible; this indicates that the mock-translation (for these items) was performed correctly. Further, in this embodiment, the double-byte, double-wide open and close brackets can be used as field boundaries.

This process provides the advantages of the basic mock-translation system, with additional capabilities for detecting double-byte problems. Again, the localization files remain readable to English-speakers, and now allow the software developer to easily check for internationalization problems.

Figure 7:
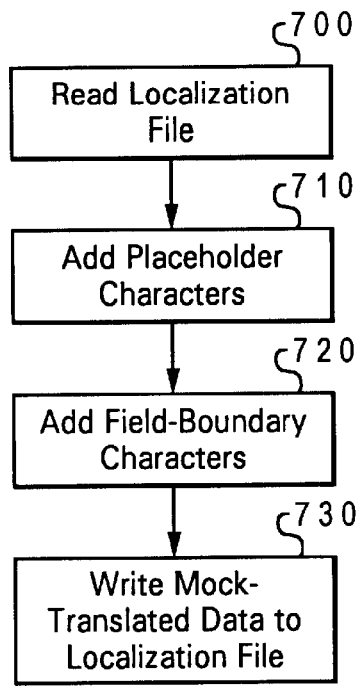
FIG. 7 depicts a flowchart of a process in accordance with a preferred embodiment of the invention.

Referring now to FIG. 7, a flowchart of a process according to the above embodiments is shown. To test the internationalization of software which uses localization files, the mock translation system first opens each of the localization files (step 700). Each entry in the file is then mock translated; first, a number of placeholder characters is added, according to internationalization guidelines (step 710). Depending on whether the double-byte technique described above is used, the placeholder characters may be single-byte characters such as the standard tilde, or may be a character such as the double-byte, double-wide dash. Next, field-boundary characters, e.g., open and close brackets, are added to the beginning and end of the entry (step 720). Again, these characters may be either single- or double-byte characters. Finally, the translated entries are written back to the localization files (step 730). Now, when the software application is run for testing, the mock-translated text will appear in place of the original text.

Another approach to solving the double-byte problem using mock-translation techniques involves replacing single-byte English characters with their double-byte equivalents. Most double-byte character sets provide corresponding double-byte English characters, but these characters appear on the screen as double-wide characters, making it easy to distinguish between a single-byte English character and its double-byte equivalent.

Figure 6:
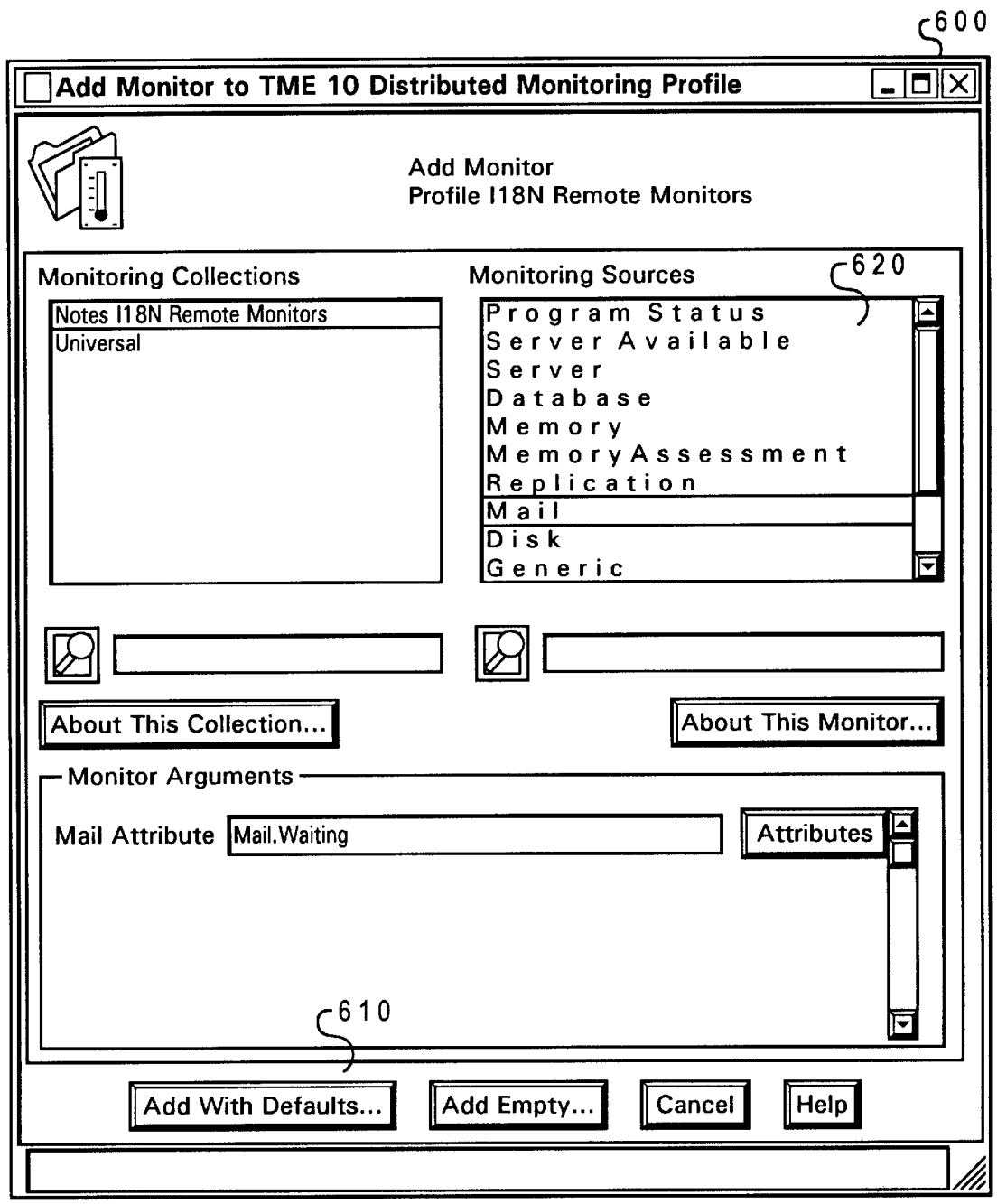
FIG. 6 is an exemplary display screen after a mock-translation process in accordance with another preferred embodiment of the invention, illustrating some errors.

This characteristic of the double-byte character sets is exploited to reveal internationalization problems. In this embodiment, instead of using placeholder characters, the original English text is replaced with the double-byte equivalent. This produces a visible text string that is twice as wide as the original text, as shown in FIG. 6. FIG. 6 shows another exemplary display screen 600, which corresponds to the untranslated screen in FIG. 4. Note menu items 620; these characters are displayed as double-wide and illustrate proper mock-translation according to this embodiment. Contrast this with button text 610; this text appears as standard, single-width English text. Therefore, the software developer can tell at a glance that some text (the single-width text) has not been properly translated, and whether the translated, double-width text is properly displayed.

Figure 8:
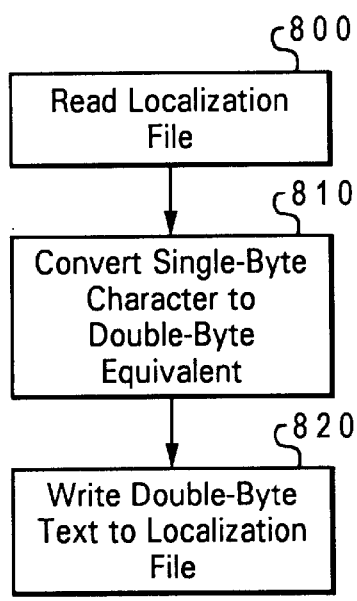
FIG. 8 depicts a flowchart of a process in accordance with another preferred embodiment of the invention.

With reference now to FIG. 8, a flowchart of a process according to the previous embodiment is shown. To test the internationalization of software which uses localization files, particularly those which will be translated to double-byte languages, the mock translation system first opens each of the localization files (step 800). Each entry in the file is then mock translated by converting each single-byte character to its double-byte, double-width equivalent (step 810). Finally, the translated entries are written back to the localization files (step 720). Now, when the software application is run for testing, the mock-translated, double-wide text will appear in place of the original text.

The mock-translation of data in the localization files can be done in many ways. For example, many localization files are stored in a compiled message catalog format called XPG4. Often, internationalized software will rely on thousands of message catalogs, and if there is an overall change to the data stored in the message catalogs, then it is important to have an automated parser system.

According to the preferred embodiment, if the message catalogs have already been compiled before the software is put through mock-translation testing, a parsing tool is provided which can decompile the message catalogs, process them, then recompile them back to the usable message catalog form. For example, in the case of XPG4-format message catalogs, at run-time the message catalogs will already have been compiled by the "gencat" program defined by X/Open. The parser will decompile the catalogs using, for example, the "dumpmsg" program available from Alfalfa Software Incorporated. The parser will then parse the decompiled file by reading each line of the file and determine whether it is a set number, a comment, a key, the only line of a message, the last line of a message, or the middle line of a message.

Then, the required insertion can be made to the beginning of every first line of a message, or whichever place is necessary. After all files are processed this way, the parser will then recompile the message catalogs by a call to the "gencat" program, and the recompiled message catalogs are ready to run with the software application.

Of course, the processing of XPG4 files and the specific examples of compiler and decompiler programs are not limiting examples; this process may be performed on any number of localization file or message catalog file formats using many different software tools. In addition, although the preferred embodiment utilizes localization files, the invention can be implemented by parsing the program for any displayable text strings and replacing such strings with the corresponding mock-translation string as disclosed herein.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for testing a software program, comprising:

reading a first textual data in a first language for the software program in a first language;

prefixing the first textual data with a plurality of placeholder characters, selected to produce a desired field length to accommodate a language translation from the first language to a second language, thereby producing a second textual data in the first language;

storing the second textual data in a machine-readable form; and displaying the second textual data in place of the first textual data on a computer display when the software program is executed, thereby enabling visual inspection of the display of the second textual data for identifying internationalization errors represented by an incorrect display of the first textual data prefixed by the plurality of placeholder characters in the first language.

2. The method of claim 1, wherein the placeholder characters are tildes.

3. The method of claim 1, wherein the placeholder characters are characters taken from a single-byte character set.

4. The method of claim 1, wherein the machine-readable form is a localization file on a computer storage medium.

5. The method of claim 1, wherein the field length is in accordance with internationalization guidelines.

6. A method for testing a software program, comprising:

reading translatable text in a first language from the software program into a computer memory;

prefixing the translatable text, in the computer memory, with a plurality of placeholder characters to produce a desired allocated field length to accommodate a translation of the translatable text, into a second language;

embracing at the beginning and end of the prefixed translatable text with specific characters to indicate display field boundaries of the prefixed translatable text, thereby producing mock-translated text;

storing the mock-translated text in machine-readable form;

displaying the mock-translated text during execution of the software program thereby enabling a visual inspection of the displayed mock-translated text for errors represented by an incorrect display of the prefixed and embraced translatable text in the first language.

7. The method of claim 6, wherein the specific characters are square brackets.

8. A computer system having at least a processor, accessible memory, and an accessible display, the computer system comprising:

means for reading translatable text in a first language from a software program into the memory;

means for prefixing the translatable text, in the computer memory, with a plurality of placeholder characters to produce a desired allocated field length to accommodate a translation of the translatable text to a second language;

means for embracing, at the beginning and the end of the prefixed translatable text, with specific characters to indicate display field boundaries of the prefixed translatable text thereby producing mock-translated text;

means for storing the mock-translated text in machine-readable form; and means for displaying the mock-translated text during execution of the software program thereby enabling a visual inspection of the displayed mock-translated text for errors represented by an incorrect display of the prefixed and embraced translatable text in the first language.

9. The system of claim 8, wherein the displayed mock-translated text indicates a hard-coded text string error if the text string is displayed without placeholder characters and beginning and end field boundary characters.

10. The system of claim 8, wherein the displayed mock-translated text indicates an expansion error if at least the end field boundary character is missing.

11. The system of claim 8, wherein the displayed mock-translated text indicates a composed piecemeal text error if the displayed text has placeholder characters interposed within the text.

12. A computer program product having computer readable program code on a computer usable medium, comprising:

instructions for adding, to translatable text in a first language from a second software program, a plurality of placeholder characters to produce a desired field length to accommodate a translation of the translatable text to a second language;

instructions for embracing, with specific characters to indicate display field boundaries, the beginning and end of the translatable text with the added placeholder characters thereby producing mock-translated text;

instructions for enabling a storing of the mock-translated text in machine-readable form; and instructions for enabling a display of the mock-translated text during execution of the second software program thereby enabling a visual inspection of the displayed mock-translated text for errors represented by an incorrect display of the prefixed and embraced translatable text in the first language.

* * * * *

UNITED STATES PATENT AND TRADEMARK OFFICE
CERTIFICATE OF CORRECTION

PATENT NO.     : 6,507,812 B1
DATED          : January 14, 2003
INVENTOR(S)    : Meade et al.

It is certified that error appears in the above-identified patent and that said Letters Patent is hereby corrected as shown below:

<u>Column 5,</u>
Line 28, after the words "tilde character" delete "( )" and insert -- ~ --.

Signed and Sealed this

First Day of July, 2003

JAMES E. ROGAN
*Director of the United States Patent and Trademark Office*